(12) United States Patent
Igarashi et al.

(10) Patent No.: US 12,273,147 B2
(45) Date of Patent: Apr. 8, 2025

(54) COHERENT OPTICAL RECEPTION DEVICE AND COHERENT OPTICAL RECEPTION METHOD

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Takuya Kanai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 211 days.

(21) Appl. No.: 18/026,559

(22) PCT Filed: Sep. 23, 2020

(86) PCT No.: PCT/JP2020/035721
§ 371 (c)(1),
(2) Date: Mar. 15, 2023

(87) PCT Pub. No.: WO2022/064555
PCT Pub. Date: Mar. 31, 2022

(65) Prior Publication Data
US 2024/0031035 A1  Jan. 25, 2024

(51) Int. Cl.
*H04B 10/61* (2013.01)
(52) U.S. Cl.
CPC ................... *H04B 10/616* (2013.01)

(58) Field of Classification Search
CPC ..................................................... H04B 10/616
(Continued)

(56) References Cited

U.S. PATENT DOCUMENTS

2020/0136722 A1* 4/2020 Urban ................ H04B 10/0779
2021/0258075 A1* 8/2021 Iiyama ............. H04B 10/25073
(Continued)

FOREIGN PATENT DOCUMENTS

WO    WO-2017212555 A1 * 12/2017

OTHER PUBLICATIONS

Honda et al; Wavelength-shifted protection for WDM-PON with AMCC scheme for 5G mobile fronthaul ;2019; Optical society of America; pp. 1-3. (Year: 2019).*

(Continued)

*Primary Examiner* — Amritbir K Sandhu

(57) ABSTRACT

A coherent optical reception device includes a coherent receiver that receives signal light in which an AMCC signal is superimposed on a main signal by phase modulation and outputs a reception signal and a digital signal processor, in which a modulation signal of the AMCC signal superimposed on the main signal is multiplied by a clock, the digital signal processor includes a symbol output, an AMCC signal code sequence demodulator, and a main signal code sequence demodulator, and the AMCC signal code sequence demodulator includes a main signal component remover that removes the main signal included in the reception signal output from the symbol output, and a clock component remover that removes a clock component included in the reception signal from which the main signal has been removed by the main signal component remover.

8 Claims, 9 Drawing Sheets

(58) Field of Classification Search
USPC .................................................. 398/202–208
See application file for complete search history.

(56) References Cited

U.S. PATENT DOCUMENTS

2023/0344522 A1* 10/2023 Igarashi ............. H04B 10/6166
2024/0031035 A1*  1/2024 Igarashi ............. H04J 14/0273

OTHER PUBLICATIONS

Herrera et al; Transmitter-embedded AMCC, LTE-A and OTDR signal for Direct Modulation Analog Radio over Fiber systems—2018; Optical society of America; pp. 1-3. (Year: 2018).*
Nakagawa et al; Development of Evaluation Platform of AMCC Superimposition on CPRI Signal Transmission for Mobile Fronthaul Network ; 2017; IEEE; pp. 1-3. (Year: 2017).*
N. Suzuki et al., "Demonstration of 100-GB/s/λ-Based Coherent WDM-PON System Using New AGC EDFA Based Upstream Preamplifier and Optically Superimposed AMCC Function", IEEE Journal of Lightwave Technology, vol. 35, No. 8, Apr. 15, 2017.

* cited by examiner

COHERENT OPTICAL RECEPTION DEVICE AND COHERENT OPTICAL RECEPTION METHOD

CROSS-REFERENCE TO RELATED APPLICATIONS

This application is a 371 U.S. National Phase of International Application No. PCT/JP2020/035721, filed on Sep. 23, 2020. The entire disclosure of the above application is incorporated herein by reference.

TECHNICAL FIELD

The present invention relates to a coherent optical reception device and a coherent optical reception method.

BACKGROUND ART

In the technology described in Non Patent Literature 1, an auxiliary management and control channel (AMCC) scheme is utilized in a digital coherent transmission system.

CITATION LIST

Non Patent Literature

Non Patent Literature 1: N. Suzuki et al., "Demonstration of 100-Gb/s/2-Based Coherent WDM-PON System Using New AGC EDFA Based Upstream Preamplifier and Optically Superimposed AMCC Function," IEEE Journal of Lightwave Technology, vol. 35, No. 8, Apr. 15, 2017.

SUMMARY OF INVENTION

Technical Problem

In a case where the AMCC scheme is utilized in the digital coherent transmission system, when separation of a main signal and the AMCC signal is performed at an optical stage, a reception light intensity in a coherent receiver decreases (specifically, the light intensity of the main signal entering a photodiode (PD) is attenuated), and noise characteristics deteriorate. Therefore, it is important to implement a method of separating the AMCC signal in a digital signal processor (DSP) stage.

Therefore, an object of the present invention is to provide a technique capable of separating the superimposed AMCC signal and the main signal at the DSP stage.

Solution to Problem

An aspect of the present invention is a coherent optical reception device including a coherent receiver that receives signal light in which an AMCC signal is superimposed on a main signal by phase modulation, converts the signal light into an analog electric signal, and outputs an in-phase component and a quadrature-phase component of the reception signal, and a digital signal processor that demodulates a code sequence of the AMCC signal and a code sequence of the main signal from the reception signal by performing digital signal processing on the reception signal, in which a modulation signal of the AMCC signal superimposed on the main signal is multiplied by a clock, the digital signal processor includes a symbol output that extracts and outputs a symbol of the main signal from the reception signal output from the coherent receiver, an AMCC signal code sequence demodulator that demodulates a code sequence of the AMCC signal, and a main signal code sequence demodulator that demodulates a code sequence of the main signal, and the AMCC signal code sequence demodulator includes a main signal component remover that removes the main signal included in the reception signal output from the symbol output and a clock component remover that removes a clock component included in the reception signal after the main signal is removed by the main signal component remover.

An aspect of the present invention is a coherent optical reception method including a coherent receiving step of receiving signal light in which an AMCC signal is superimposed on a main signal by phase modulation, converting the signal light into an analog electric signal, and outputting an in-phase component and a quadrature-phase component of the reception signal, and a digital signal processing step of demodulating a code sequence of the AMCC signal and a code sequence of the main signal from the reception signal by performing digital signal processing on the reception signal, in which a modulation signal of the AMCC signal superimposed on the main signal is multiplied by a clock, the digital signal processing step includes a symbol output step of extracting and outputting a symbol of the main signal from the reception signal output in the coherent receiving step, an AMCC signal code sequence demodulation step of demodulating a code sequence of the AMCC signal, and a main signal code sequence demodulation step of demodulating a code sequence of the main signal, and the AMCC signal code sequence demodulation step includes a main signal component removing step of removing the main signal included in the reception signal output in the symbol output step and a clock component removing step of removing a clock component included in the reception signal after the main signal is removed in the main signal component removing step.

Advantageous Effects of Invention

According to the present invention, it is possible to provide a technique capable of appropriately separating the superimposed AMCC signal and the main signal at the DSP (digital signal processor) stage.

DESCRIPTION OF EMBODIMENTS

Embodiments of a coherent optical reception device and a coherent optical reception method of the present invention will be described in detail with reference to the drawings.

First Embodiment

Figure 1:
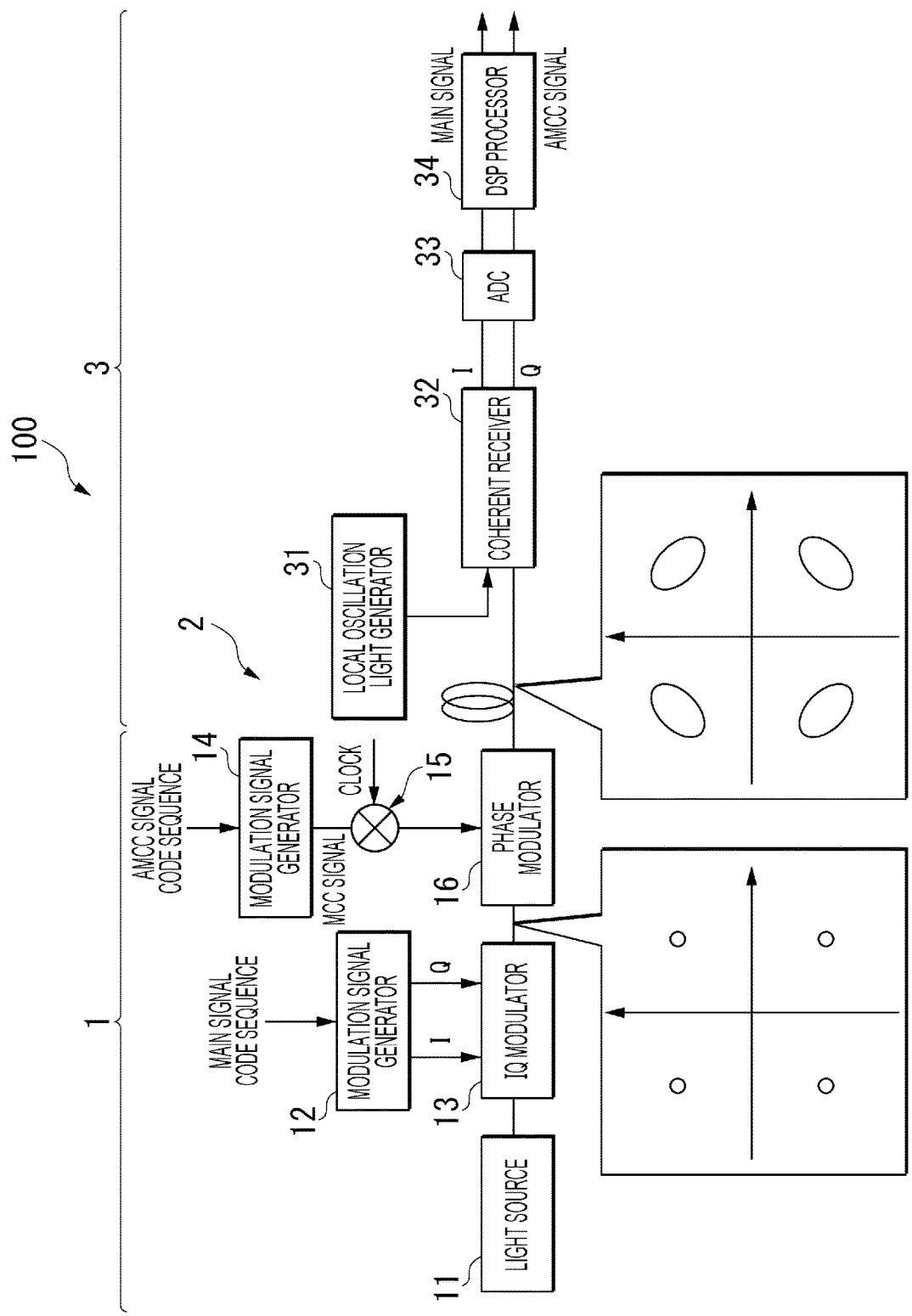
FIG. 1 is a diagram illustrating an example of a coherent optical transmission system to which a coherent optical reception device of a first embodiment is applied.

FIG. 1 is a diagram illustrating an example of a coherent optical transmission system 100 to which a coherent optical reception device 3 of a first embodiment is applied.

In the example illustrated in FIG. 1, the coherent optical transmission system 100 includes a coherent optical transmission device 1, an optical fiber 2, and a coherent optical reception device 3.

The coherent optical transmission device 1 includes a light source 11, a modulation signal generator 12, an IQ modulator 13, a modulation signal generator 14, a clock multiplicator 15, and a phase modulator 16.

The light source 11 emits continuous wave light. As the light source 11, for example, a semiconductor laser or the like is used.

A main signal code sequence is input to the modulation signal generator 12. The modulation signal generator 12 generates a modulation signal of the main signal based on the input main signal code sequence. The modulation signal of the main signal includes an I (in-phase) component and a Q (quadrature-phase) component. The modulation signal of the main signal generated by the modulation signal generator 12 is output to the IQ modulator 13.

The IQ modulator 13 performs IQ modulation corresponding to the main signal based on the modulation signal of the main signal input from the modulation signal generator 12. The IQ modulator 13 performs, for example, 4-level quadrature phase shift keying (QPSK) modulation as IQ modulation corresponding to the main signal. The constellation of the signal light output from the IQ modulator 13 is, for example, as illustrated in the lower left of FIG. 1.

The AMCC signal code sequence is input to the modulation signal generator 14. The modulation signal generator 14 generates a modulation signal of the AMCC signal based on the input AMCC signal code sequence. The modulation signal of the AMCC signal generated by the modulation signal generator 14 is output to the clock multiplicator 15.

The clock multiplicator 15 multiplies the modulation signal of the AMCC signal input from the modulation signal generator 14 by a clock. The signal generated by the clock multiplicator 15 (that is, the signal obtained by multiplying the modulation signal corresponding to the AMCC signal by the clock) is output to the phase modulator 16.

If the clock multiplicator 15 does not multiply the modulation signal of the AMCC signal by the clock, the low-speed AMCC signal cannot be distinguished from the low-speed phase offset that is the phase difference between the signal optical carrier and the local oscillation light, and thus, is removed in the phase offset compensation in the coherent optical reception device 3. Therefore, in the example illustrated in FIG. 1, as described above, the clock multiplicator 15 multiplies the modulation signal of the AMCC signal input from the modulation signal generator 14 by the clock.

Figure 2:
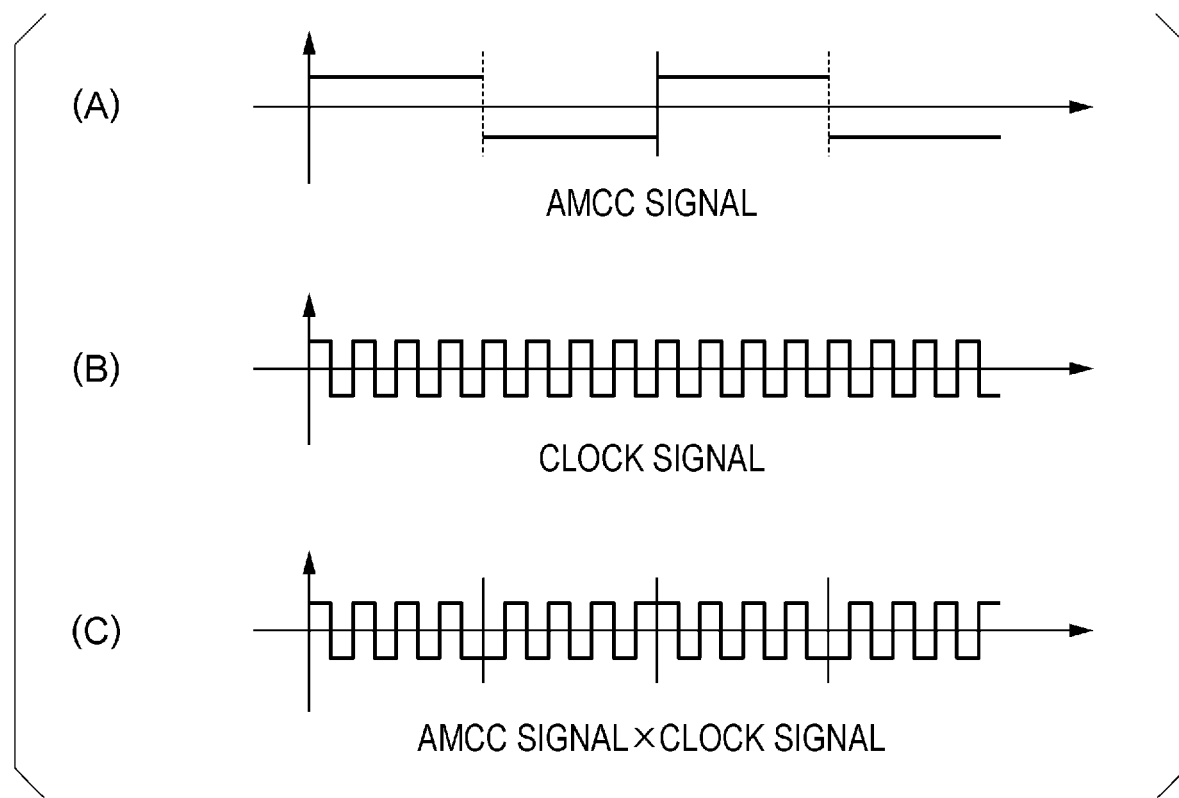
FIG. 2 is a diagram for illustrating processing in a clock multiplicator.

FIG. 2 is a diagram for illustrating processing in the clock multiplicator 15.

Specifically, FIG. 2(A) illustrates an example of the modulation signal of the AMCC signal input to the clock multiplicator 15 (that is, the modulation signal of the AMCC signal generated by the modulation signal generator 14). FIG. 2(B) illustrates an example of a clock (clock signal) multiplied by the modulation signal of the AMCC signal illustrated in FIG. 2(A) by the clock multiplicator 15. FIG. 2(C) illustrates an example of a signal output from the clock multiplicator 15 (that is, the signal obtained by multiplying the modulation signal corresponding to the AMCC signal by the clock).

In the example illustrated in FIG. 2, the amplitude of the clock (clock signal) changes at the symbol rate of the main signal.

As illustrated in FIG. 2, by multiplying the modulation signal corresponding to the AMCC signal by the clock, it is possible to avoid removal of the AMCC signal in phase offset compensation in the coherent optical reception device 3.

In the example illustrated in FIG. 1, the phase modulator 16 performs phase modulation corresponding to the AMCC signal based on the signal input from the clock multiplicator 15. The phase modulator 16 performs, for example, binary phase modulation as the phase modulation corresponding to the AMCC signal. In addition, the phase modulator 16 outputs, to the optical fiber 2, signal light in which the AMCC signal is superimposed on the main signal by phase modulation. The constellation of the signal light (specifically, signal light output from the coherent optical transmission device 1 and transmitted via the optical fiber 2) output from the phase modulator 16 is, for example, as illustrated in the lower center of FIG. 1.

The optical fiber 2 functions as a transmission path of the signal light output from the coherent optical transmission device 1.

Digital coherent transmission systems have been put into practical use for longer distances and larger capacities of optical communication systems. In the digital coherent transmission systems, coherent reception is performed by a receiver to acquire not only intensity of signal light but also information of a phase component. In these systems, the influence of thermal noise at the time of photoelectric conversion can be suppressed by coherent detection, and waveform degradation due to transmission and waveform degradation due to device band limitation can be compensated for by digital signal processing (DSP), so that a high loss budget improvement effect can be expected.

In the example illustrated in FIG. 1, the coherent optical reception device 3 receives the signal light output from the coherent optical transmission device 1 and transmitted by the optical fiber 2. The coherent optical reception device 3 includes a local oscillation light generator 31, a coherent receiver 32, an analog-to-digital converter (ADC) 33, and a digital signal processor (DSP processor) 34.

The local oscillation light generator 31 generates local oscillation light.

The coherent receiver 32 receives signal light (that is, the signal light in which the AMCC signal is superimposed on the main signal) transmitted by the optical fiber 2 and converts the optical signal into an analog electric signal. Specifically, the coherent receiver 32 performs coherent reception using the local oscillation light generated by the local oscillation light generator 31, and outputs the in-phase (I) component and the quadrature-phase (Q) component of the reception signal.

That is, the signal light received by the coherent receiver 32 is obtained by superimposing the AMCC signal on the main signal by the phase modulator 16 of the coherent optical transmission device 1 performing the phase modulation corresponding to the AMCC signal.

The analog-to-digital converter 33 samples and discretizes the analog electric signal (specifically, the in-phase component and the quadrature-phase component of the reception signal output from the coherent receiver 32) output from the coherent receiver 32.

The digital signal processor 34 performs digital signal processing on the reception signal discretized by the analog-to-digital converter 33 to demodulate the code sequence corresponding to the AMCC signal and the code sequence corresponding to the main signal from the reception signal.

Figure 3:
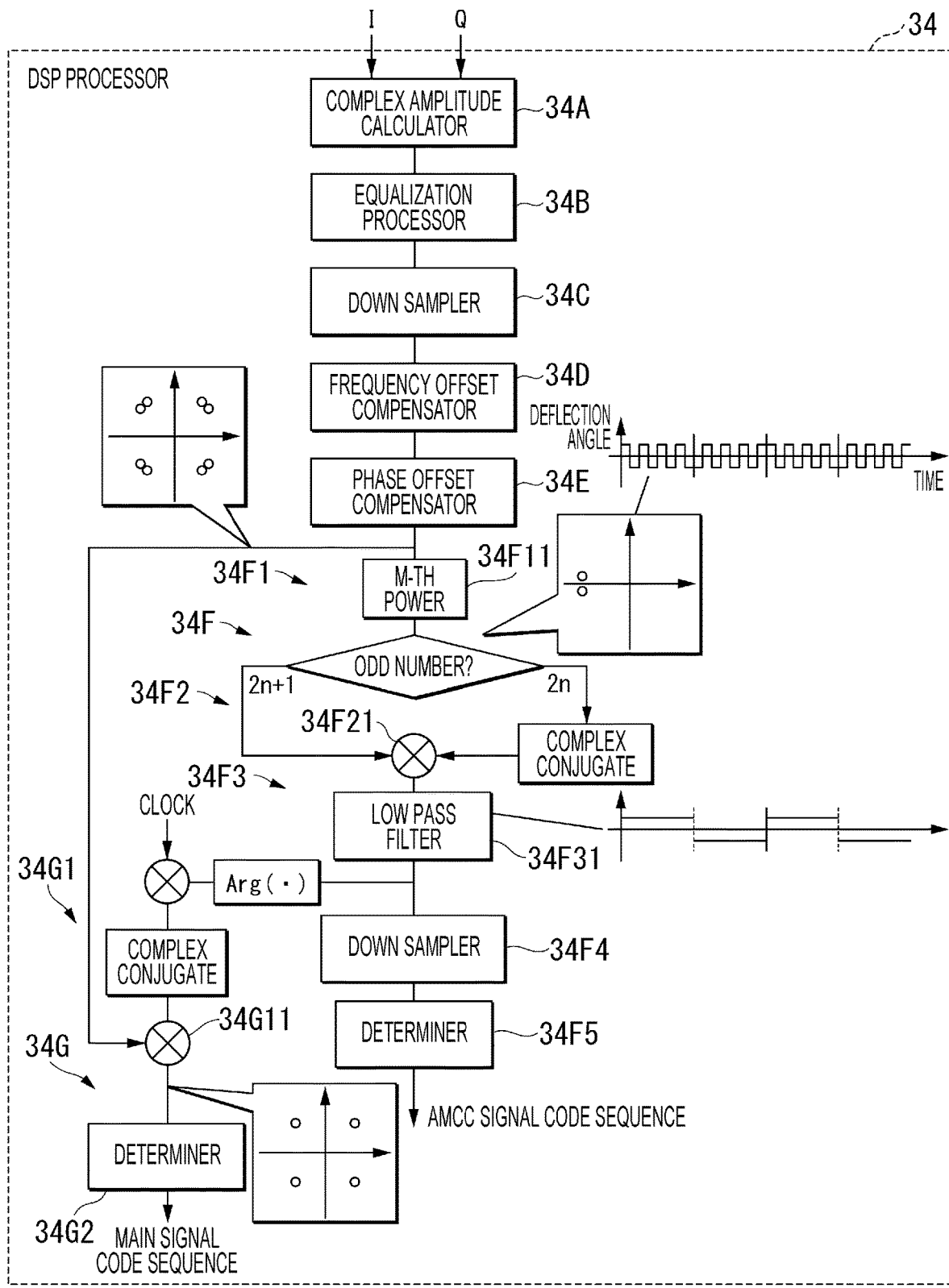
FIG. 3 is a diagram illustrating an example of a detailed configuration of a digital signal processor illustrated in FIG. 2.

FIG. 3 is a diagram illustrating an example of a detailed configuration of the digital signal processor 34 illustrated in FIG. 2.

In the example illustrated in FIG. 3, the digital signal processor 34 includes a complex amplitude calculator 34A, an equalization processor 34B, a down sampler 34C, a frequency offset compensator 34D, a phase offset compensator 34E, an AMCC signal code sequence demodulator 34F, and a main signal code sequence demodulator 34G.

The complex amplitude calculator 34A calculates the complex amplitude of the reception signal including the in-phase component (I signal) and the quadrature-phase component (Q signal) discretized by the analog-to-digital converter 33. Assuming that the amplitude of the I signal is $E_I$ and the amplitude of the Q signal is $E_Q$, a complex amplitude E of the reception signal is expressed by the following equation.

$$E = (E_I^2 + E_Q^2)^{1/2} \exp j(\tan^{-1}(E_Q/E_I))$$

Here, $(E_I^2 + E_Q^2)^{1/2}$ is an absolute value.

The equalization processor 34B performs normal equalization processing (for example, transmission, compensation of waveform distortion by a transceiver, or the like) in the digital coherent transmission system. Specifically, the equalization processor 34B performs equalization processing on the signal output from the complex amplitude calculator 34A.

The down sampler 34C performs normal down-sampling (for example, thinning processing) in the digital coherent transmission system. Specifically, the down sampler 34C down-samples the signal output from the equalization processor 34B and extracts only symbols.

The frequency offset compensator 34D performs normal frequency offset compensation (for example, processing of removing a frequency offset between the light source 11 of the coherent optical transmission device 1 and the local oscillation light source of the local oscillation light generator 31 of the coherent optical reception device 3) in the digital coherent transmission system. Specifically, the frequency offset compensator 34D performs frequency offset compensation on the signal output from the down sampler 34C.

The phase offset compensator 34E performs normal phase offset compensation (for example, processing of removing a phase offset between the light source 11 of the coherent optical transmission device 1 and the local oscillation light source of the local oscillation light generator 31 of the coherent optical reception device 3) in the digital coherent transmission system. Specifically, the phase offset compensator 34E performs phase offset compensation on the signal output from the frequency offset compensator 34D. The phase offset compensator 34E functions as a symbol output that extracts a symbol of the main signal from the reception signal output from the coherent receiver 32 and outputs the symbol.

The constellation of the signal output from the phase offset compensator 34E is, for example, as illustrated in the center left of FIG. 3. The reception signal output from the phase offset compensator 34E includes not only the main signal but also the AMCC signal superimposed as phase noise. Therefore, as illustrated in the constellation in the left center of FIG. 3, an inter-symbol distance is smaller than that in a case where the AMCC signal is not superimposed. That is, the reception signal output from the phase offset compensator 34E is in a state where the reception sensitivity is deteriorated.

The reception signal output from the phase offset compensator 34E is input to the AMCC signal code sequence demodulator 34F and the main signal code sequence demodulator 34G.

In the example illustrated in FIG. 3, the AMCC signal code sequence demodulator 34F demodulates the code sequence of the AMCC signal included in the reception signal output from the phase offset compensator 34E. The AMCC signal code sequence demodulator 34F includes a main signal component remover 34F1, a clock component remover 34F2, a high frequency noise eliminator 34F3, a down sampler 34F4, and a determiner 34F5.

The main signal component remover 34F1 removes the main signal included in the reception signal output from the phase offset compensator 34E. The main signal component remover 34F1 includes an M-th operator 34F11 that performs an M-th operation on the reception signal output from the phase offset compensator 34E. For example, in a case where the IQ modulator 13 of the coherent optical transmission device 1 performs 4-level QPSK modulation as IQ modulation corresponding to the main signal, the M-th operator 34F11 performs an operation of multiplying the reception signal output from the phase offset compensator 34E by 4 (that is, M=4).

The main signal component remover 34F1 removes the main signal included in the reception signal output from the phase offset compensator 34E by the M-th operator 34F11 performing the M-th operation on the reception signal output from the phase offset compensator 34E.

The phase amplitude E(n) of the reception signal output from the phase offset compensator 34E is expressed by Equation (1) below. In Equation (1), n={0, 1, 2, 3, . . . } represents symbol time.

$$E(n) = \exp(j(\varphi_{main}(n) + \varphi_{AMCC}(n) \times \varphi_{clock}(n))) \qquad (1)$$

In Equation (1) above, $\varphi_{AMCC}(n)$ represents an AMCC signal included in the reception signal. For example, in a case where the phase modulator 16 of the coherent optical transmission device 1 performs binary phase modulation as phase modulation corresponding to the AMCC signal, $\varphi_{AMCC} = k$ and $-k$ are satisfied.

$\varphi_{main}(n)$ indicates a main signal included in the reception signal. For example, in a case where the IQ modulator 13 of the coherent optical transmission device 1 performs 4-level QPSK modulation as IQ modulation corresponding to the main signal, the phase of the main signal takes any of $\varphi_{main}(n) = \pi 1/4, \pi 3/4, \pi 5/4,$ and $\pi 7/4$.

$\varphi_{clock}(n)$ indicates a clock included in the reception signal. In a case where the clock frequency is set to a frequency at which the positive and negative are inverted for each symbol of the main signal (that is, in a case where the clock frequency is 1/2 of the symbol rate of the main signal), $\varphi_{clock}(n)$ is expressed as follows.

When n is odd, if n=2m+1, and
when n is even, if n=2m, the following equations are established:

$$\varphi_{clock}(2m+1)=c$$

$$\varphi_{clock}(2m)=-c.$$

When the M-th operator 34F11 performs an operation to multiply the reception signal E(n) output from the phase offset compensator 34E by M, an operation result of the M-th operator 34F11 is as shown in Equation (2) below.

$$E^4=(\exp(j(\varphi_{main}+\varphi_{AMCC}(n)\times(\varphi_{clock}(n))))^4=\exp(j(4\varphi_{main}+4\varphi_{AMCC}(n)\varphi_{clock}(n))) \quad (2)$$

At this time, $4\varphi_{main}$ is expressed as follows.

When $\varphi_{main}=\pi/4$, $$4_{main}=4\times(\pi/4)=\pi,$$

when $\varphi_{main}=\pi 3/4$, $$4\pi_{main}=4\times(\pi 3/4)=3\pi=\pi,$$

when $\varphi_{main}=\pi 5/4$, $$4\pi_{main}=4\times(\pi 5/4)=5\pi=\pi, \text{ and}$$

when $\varphi_{main}=\pi 7/4$, $$4\pi_{main}=4\times(\pi 7/4)=7\pi=\pi$$

In this manner, when the M-th operator 34F11 performs an operation to multiply the reception signal output from the phase offset compensator 34E by M, all modulation components become n. Therefore, the main signal component remover 34F1 can remove the modulation component (main signal) included in the reception signal output from the phase offset compensator 34E.

The constellation of the reception signal output from the main signal component remover 34F1 (constellation of reception signal after main signal is removed by main signal component remover 34F1) is, for example, as illustrated in the center right of FIG. 3.

In the example illustrated in FIG. 3, the clock component remover 34F2 removes the clock component included in the reception signal from which the main signal has been removed by the main signal component remover 34F1. The clock component remover 34F2 includes a complex conjugate product calculator 34F21. The complex conjugate product calculator 34F21 calculates a complex conjugate product of two adjacent symbols included in the signal after the main signal component remover 34F1 performs the operation of multiplying the reception signal by M. That is, in the clock component remover 34F2, the complex conjugate product calculator 34F21 calculates the complex conjugate product of two adjacent symbols included in the signal after the main signal component remover 34F1 performs the operation of multiplying the reception signal by M, thereby removing the clock component included in the reception signal after the main signal is removed by the main signal component remover 34F1.

Specifically, the operation performed by the M-th operator 34F11 (operation of multiplying the reception signal E(n) output from the phase offset compensator 34E by M) (M=4) is expressed by Equation (3) below, and the operation performed by the complex conjugate product calculator 34F21 is expressed by Equation (4) below.

$$E^4 = \exp(j(\pi + 4\varphi_{AMCC}(n)\varphi_{clock}(n))) \quad (3)$$

$$E_{AMCC}(m) = E^4(2m+1)\times(E^4(2m))^* = \exp(j(\pi + 4\varphi_{AMCC}(2m+1)\times c))\times \quad (4)$$
$$\exp(-j(\pi + 4\varphi_{AMCC}(2m)\times -c))) = \exp(j(8\varphi_{AMCC}(2m)\times c))$$

Here, * represents a complex conjugate. In addition, the AMCC signal is sufficiently slower than the main signal, and $\varphi_{AMCC}(2m+1)=\varphi_{AMCC}(2m)$ is established.

As described above, it is possible to remove the clock signal from the reception signal and extract the AMCC signal.

In the example illustrated in FIG. 3, the high frequency noise eliminator 34F3 eliminates the high frequency noise included in the reception signal from which the clock component has been removed by the clock component remover 34F2. The high frequency noise eliminator 34F3 includes a low pass filter 34F31. That is, the high frequency noise eliminator 34F3 eliminates the high frequency noise included in the reception signal from which the clock component has been removed by using the low pass filter 34F31.

The down sampler 34F4 extracts the symbol of the AMCC signal by performing down-sampling on the reception signal from which the high frequency component has been eliminated by the high frequency noise eliminator 34F3. Specifically, the down sampler 34F4 performs down-sampling from the symbol rate of the main signal to the symbol rate of the AMCC signal.

The determiner 34F5 demodulates the code sequence of the AMCC signal included in the reception signal by performing threshold determination.

The main signal code sequence demodulator 34G demodulates the code sequence of the main signal included in the reception signal output from the phase offset compensator 34E. The main signal code sequence demodulator 34G includes an AMCC signal component remover 34G1 and a determiner 34G2.

The AMCC signal component remover 34G1 removes the AMCC signal included in the reception signal output from the phase offset compensator 34E. The AMCC signal component remover 34G1 includes a complex conjugate product calculator 34G11.

The complex conjugate product calculator 34G11 calculates a complex conjugate product of the reception signal (specifically, the reception signal output from the low pass filter 34F31) from which the high frequency noise has been eliminated by the high frequency noise eliminator 34F3 and the reception signal output from the phase offset compensator 34E.

Specifically, the complex conjugate product calculator 34G11 calculates a complex conjugate product of a product obtained by multiplying the phase of the AMCC signal $E_{AMCC}$ by a clock and the original reception signal E(n) as expressed by Equation (5) below.

$$E(n)\times\exp(j(8\varphi_{AMCC}(n)\times c\times\varphi_{clock}(n)\times\alpha))^*=\exp(j(\varphi_{main}(n)+\varphi_{AMCC}(n)\times\varphi_{clock}(n)))\times\exp(-j(8\varphi_{AMCC}(n)\times c\times\varphi_{clock}(n)\times\alpha))=\exp(j(\varphi_{main}(n)+\varphi_{AMCC}(n)\times\varphi_{clock}(n)\times(1-8c\alpha)))$$

Here, when $\alpha$ is set such that $1-8c\alpha=0$, $$=\exp(j(\varphi_{main}(n))) \quad (5)$$

As described above, the AMCC signal can be removed from the main signal component, and the noise characteristic of the main signal can be improved.

The constellation of the signal output from the complex conjugate product calculator 34G11 is, for example, as illustrated in the lower left of FIG. 3.

The determiner 34G2 performs normal threshold determination in the digital coherent transmission system, and outputs a main signal code sequence.

The coherent optical reception device 3 can be configured using a processor such as a central processing unit (CPU) and a memory. The coherent optical reception device 3 functions as an AMCC signal code sequence demodulator 34F, a main signal code sequence demodulator 34G, and the like of the digital signal processor 34 when the processor executes a program. All or some of the functions of the coherent optical reception device 3 may be realized by using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, a ROM, a CD-ROM, or a semiconductor storage device (for example, a solid state drive (SSD)), or a storage device such as a hard disk or a semiconductor storage device built in a computer system. The program may be transmitted via an electric communication line.

As described above, in the coherent optical transmission system 100 to which the coherent optical reception device 3 of the first embodiment is applied, the phase modulator 16 of the coherent optical transmission device 1 superimposes the AMCC signal on the main signal by phase modulation. In addition, since the clock multiplicator 15 multiplies the modulation signal of the AMCC signal by the clock, removal of the AMCC signal in the phase offset compensator 34E of the coherent optical reception device 3 is avoided.

In the coherent optical reception device 3 of the first embodiment, the M-th operator 34F11 uses the M-th operation method, so that the main signal component remover 34F1 removes the main signal and separates the AMCC signal. In addition, the AMCC signal component remover 34G1 subtracts the AMCC signal from the main signal to improve the noise characteristic of the main signal. Furthermore, the complex conjugate product calculator 34F21 removes a clock component from the reception signal by obtaining a complex conjugate product of two symbols.

According to the coherent optical reception device 3 of the first embodiment, the superimposed AMCC signal and the main signal can be separated in the digital signal processor 34.

Figure 4:
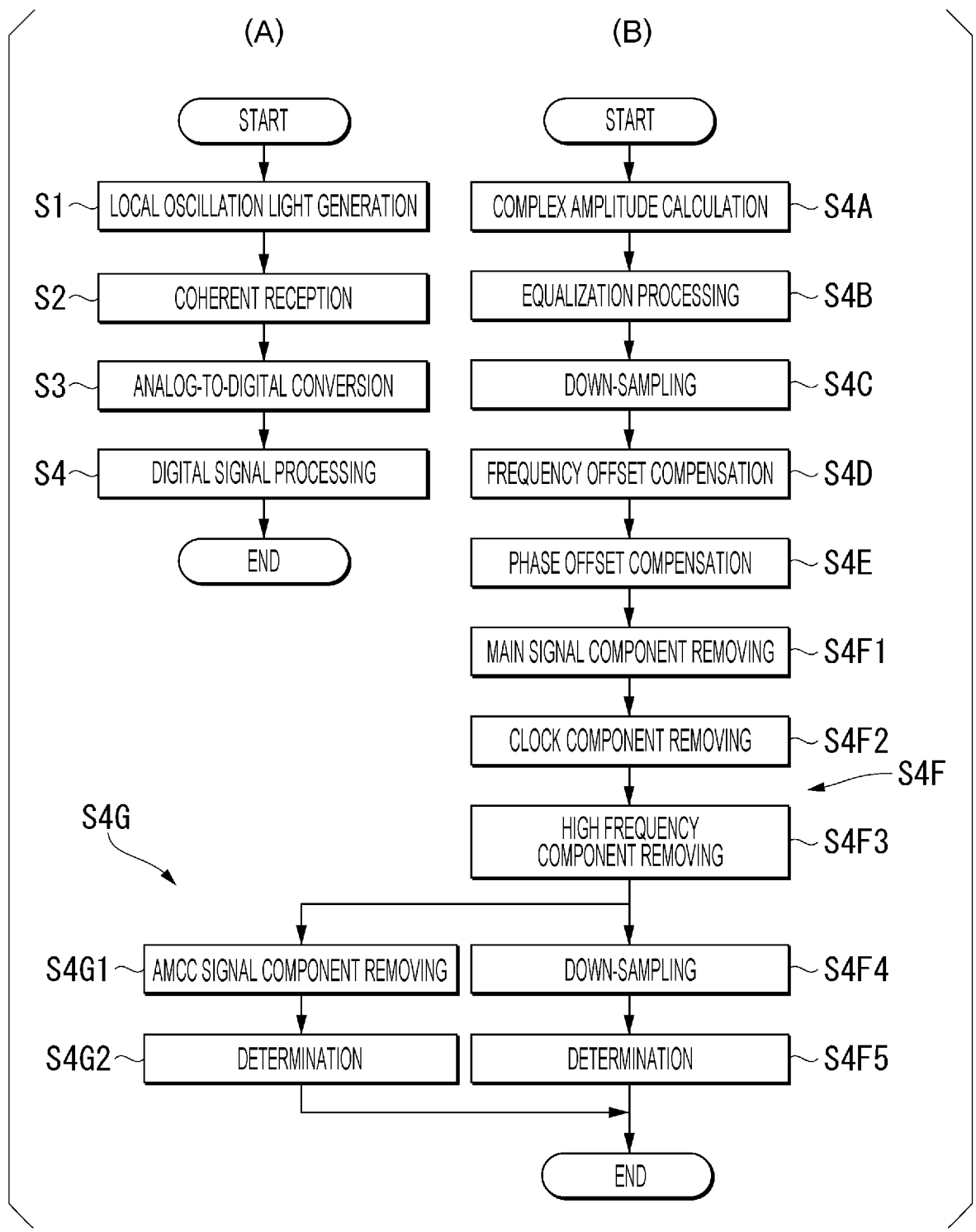
FIG. 4 is a flowchart for illustrating an example of processing executed in the coherent optical reception device of the first embodiment.

FIG. 4 is a flowchart for illustrating an example of processing executed in the coherent optical reception device 3 of the first embodiment. Specifically, FIG. 4(A) illustrates main processing executed in the coherent optical reception device 3 of the first embodiment, and FIG. 4(B) illustrates processing executed in step S4 of FIG. 4(A).

In the example illustrated in FIG. 4, in step S1, the local oscillation light generator 31 generates local oscillation light.

Next, in step S2, the coherent receiver 32 receives signal light transmitted by the optical fiber 2 (that is, the signal light in which the AMCC signal is superimposed on the main signal), converts the optical signal into an analog electric signal, and outputs the in-phase component and the quadrature-phase component of the reception signal. The modulation signal of the AMCC signal superimposed on the main signal is multiplied by a clock. Specifically, in step S2, the coherent receiver 32 performs coherent reception using the local oscillation light generated in step S1.

Next, in step S3, the analog-to-digital converter 33 samples and discretizes the analog electric signal output from the coherent receiver 32 (that is, performs analog-to-digital conversion).

Next, in step S4, the digital signal processor 34 performs digital signal processing on the reception signal discretized in step S3 to demodulate the code sequence corresponding to the AMCC signal and the code sequence corresponding to the main signal from the reception signal.

Specifically, in step S4A, the complex amplitude calculator 34A calculates the complex amplitude of the reception signal including the in-phase component (I signal) and the quadrature-phase component (Q signal) discretized in step S3.

Next, in step S4B, the equalization processor 34B performs equalization processing on the signal output from the complex amplitude calculator 34A in step S4A.

Next, in step S4C, the down sampler 34C down-samples the signal output from the equalization processor 34B in step S4B.

Next, in step S4D, the frequency offset compensator 34D performs frequency offset compensation on the signal output from the down sampler 34C in step S4C.

Next, in step S4E, the phase offset compensator 34E performs phase offset compensation on the signal output from the frequency offset compensator 34D in step S4D.

Next, in step S4F, the AMCC signal code sequence demodulator 34F demodulates the code sequence of the AMCC signal included in the signal output from the phase offset compensator 34E in step S4E.

Specifically, in step S4F1, the main signal component remover 34F1 performs the M-th operation on the signal output from the phase offset compensator 34E in step S4E, thereby removing the main signal included in the reception signal.

Next, in step S4F2, the clock component remover 34F2 calculates a complex conjugate product of two adjacent symbols included in the signal after the operation of multiplying the reception signal by M is performed in step S4F1, thereby removing a clock component included in the reception signal after the main signal is removed in step S4F1.

Next, in step S4F3, the high frequency noise eliminator 34F3 eliminates the high frequency noise included in the reception signal from which the clock component has been eliminated in step S4F2 by using the low pass filter 34F31.

Next, in step S4F4, the down sampler 34F4 extracts a symbol by performing down-sampling on the reception signal from which the high frequency component has been removed in step S4F3.

Next, in step S4F5, the determiner 34F5 performs threshold determination to demodulate the code sequence of the AMCC signal included in the reception signal.

In addition, after step S4F3, in step S4G, the main signal code sequence demodulator 34G demodulates the code sequence of the main signal included in the signal output from the phase offset compensator 34E in step S4E.

Specifically, in step S4G1, the AMCC signal component remover 34G1 calculates the complex conjugate product of the reception signal from which the high frequency noise has been removed in step S4F3 and the signal output from the phase offset compensator 34E in step S4E, thereby removing the AMCC signal included in the signal output from the phase offset compensator 34E.

Next, in step S4G2, the determiner 34G2 performs normal threshold determination in the digital coherent transmission system, and outputs a main signal code sequence.

Second Embodiment

Hereinafter, a second embodiment of a coherent optical reception device and a coherent optical reception method of the present invention will be described.

The coherent optical reception device 3 of the second embodiment is configured similarly to the coherent optical reception device 3 of the first embodiment described above except for the points described later. Therefore, according to the coherent optical reception device 3 of the second embodiment, it is possible to achieve the same effects as those of the coherent optical reception device 3 of the first embodiment described above except for the points described later.

Figure 5:
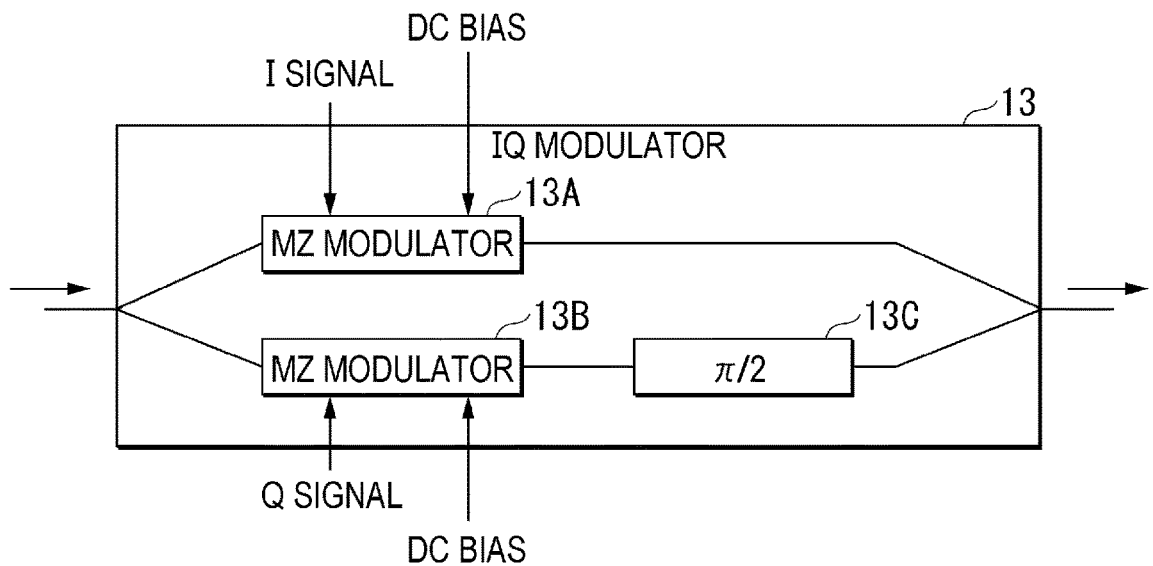
FIG. 5 is a diagram illustrating an example of an IQ modulator of a coherent optical transmission device included in a coherent optical transmission system to which a coherent optical reception device of a second embodiment is applied.

FIG. 5 is a diagram illustrating an example of the IQ modulator 13 of the coherent optical transmission device 1 included in a coherent optical transmission system 100 to which the coherent optical reception device 3 of the second embodiment is applied.

As described above, in the example illustrated in FIG. 1, the coherent optical transmission device 1 includes the phase modulator 16 that performs phase modulation corresponding to the AMCC signal, separately from the IQ modulator 13.

On the other hand, in the example illustrated in FIG. 5, the IQ modulator 13 performs IQ modulation corresponding to the main signal and performs phase modulation corresponding to the AMCC signal. That is, the phase modulation corresponding to the AMCC signal is performed in the IQ modulator 13 on which the IQ modulation corresponding to the main signal is performed. The IQ modulator 13 includes a Mach-Zehnder (MZ) modulator 13A, a Mach-Zehnder (MZ) modulator 13B, and a π/2 phase difference setter 13C. Light is received to the IQ modulator 13 from a light source 11 (see FIG. 1). The received light is separated into two paths, one of the separated light is received to the Mach-Zehnder modulator 13A, and the other of the separated light is input to the Mach-Zehnder modulator 13B.

In addition, an I signal (in-phase component of a modulation signal of a main signal) and a DC bias are applied to the Mach-Zehnder modulator 13A. The Mach-Zehnder modulator 13A modulates the intensity and the phase of the light received from light source 11 based on the applied I signal and the DC bias, and emits the light in which the intensity and the phase are modulated.

The Q signal (the quadrature-phase component of a modulation signal of a main signal) and the DC bias are applied to the Mach-Zehnder modulator 13B. The Mach-Zehnder modulator 13B modulates the intensity and the phase of the light received from light source 11 based on the applied Q signal and the DC bias, and emits the light in which the intensity and the phase are modulated to the π/2 phase difference setter 13C.

The π/2 phase difference setter 13C provides a phase difference of π/2 between the path of the light emitted from the Mach-Zehnder modulator 13A and the path of the light emitted from the Mach-Zehnder modulator 13B.

Figure 6:
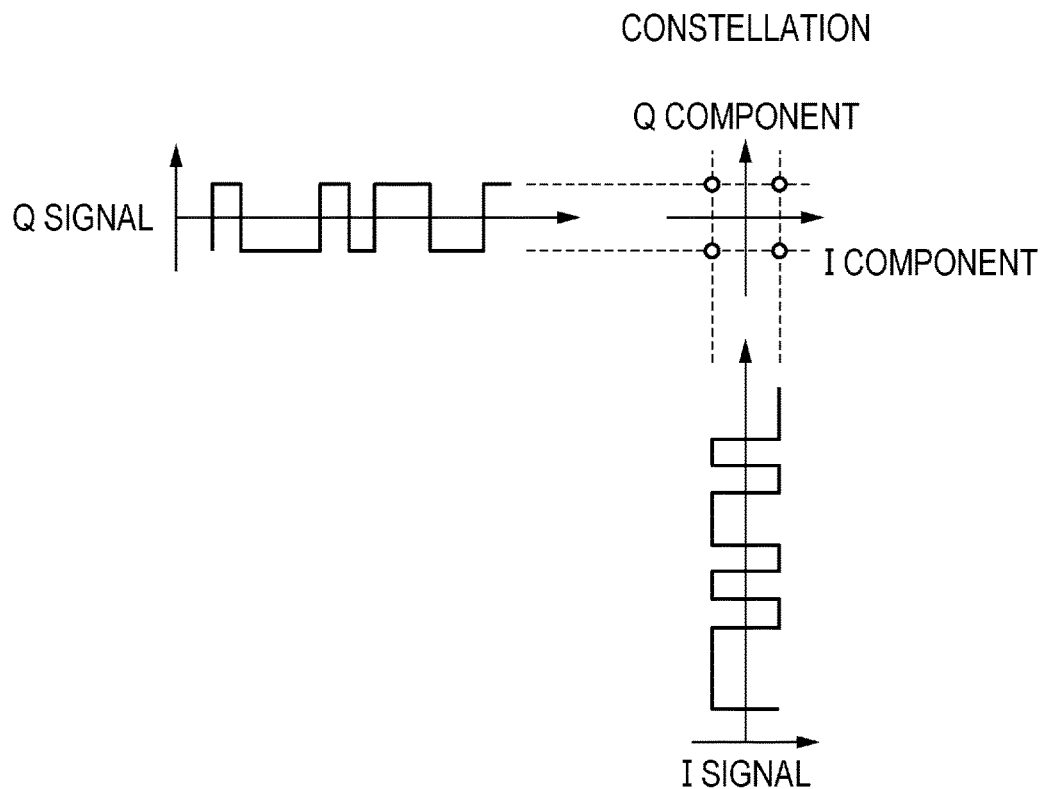
FIG. 6 is a diagram illustrating a relationship of an I signal, a Q signal, and a constellation.

FIG. 6 is a diagram illustrating a relationship among the I signal, the Q signal, and the constellation.

By providing a phase difference of π/2 between the path of the light emitted from the Mach-Zehnder modulator 13A and the path of the light emitted from the Mach-Zehnder modulator 13B, the π/2 phase difference setter 13C can associate the I component and the Q component on the constellation with the I signal applied to the Mach-Zehnder modulator 13A and the Q signal applied to the Mach-Zehnder modulator 13B as illustrated in FIG. 6.

Figure 7:
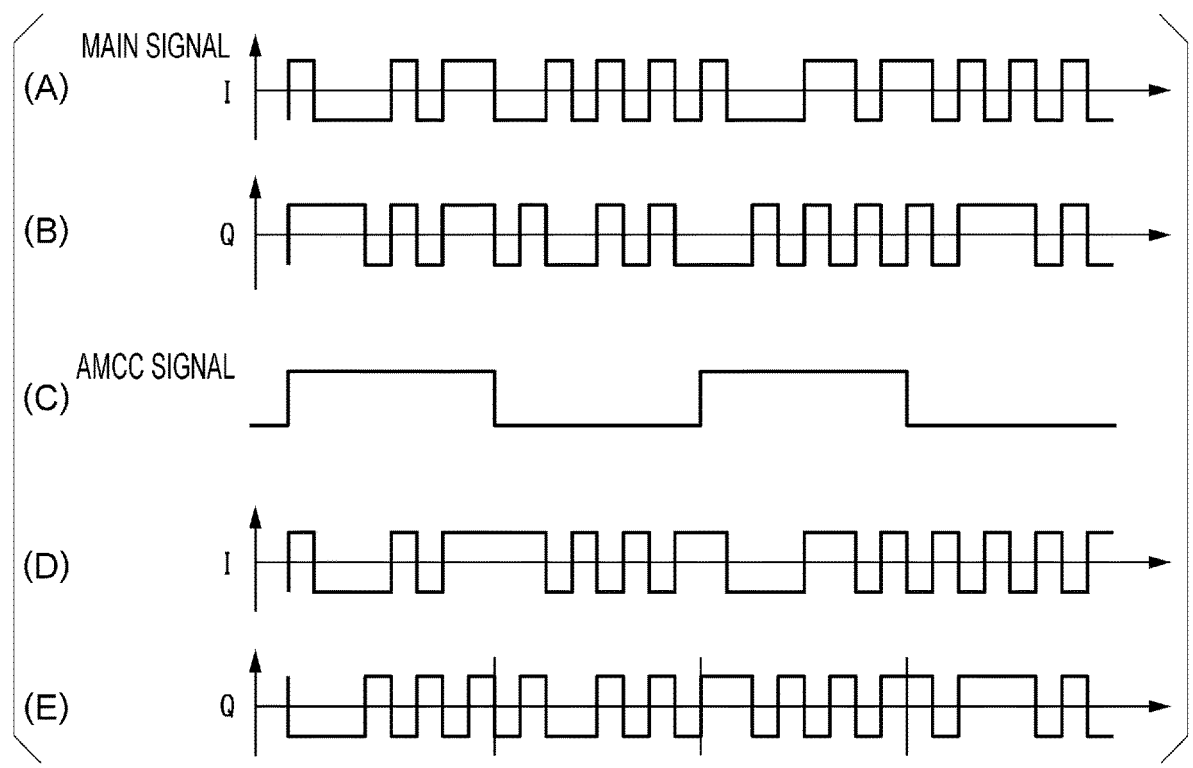
FIG. 7 is a diagram for illustrating a modulation signal to the IQ modulator of the coherent optical transmission device included in the coherent optical transmission system to which the coherent optical reception device of the second embodiment is applied.

FIG. 7 is a diagram for illustrating a modulation signal to the IQ modulator 13 of the coherent optical transmission device 1 included in the coherent optical transmission system 100 to which the coherent optical reception device 3 of the second embodiment is applied.

Specifically, FIG. 7(A) illustrates a time waveform of the in-phase component (I signal) of the modulation signal of the main signal, and FIG. 7(B) illustrates a time waveform of the quadrature-phase component (Q signal) of the modulation signal of the main signal.

FIG. 7(C) illustrates a time waveform of the AMCC signal. In detail, FIG. 7(C) illustrates a time waveform of the AMCC signal before being multiplied by the clock. In practice, the signal after being multiplied by the clock is used as the AMCC signal. The AMCC signal is a binary signal that takes 1 or 0.

FIG. 7(D) illustrates a signal in which the sign is the same as the in-phase component of the modulation signal of the main signal illustrated in FIG. 7(A) in the section in which the AMCC signal illustrated in FIG. 7(C) is 1, and the sign is opposite to the in-phase component of the modulation signal of the main signal illustrated in FIG. 7(A) in the section in which the AMCC signal illustrated in FIG. 7(C) is 0.

FIG. 7(E) illustrates a signal in which the sign is opposite to the quadrature-phase component of the modulation signal of the main signal illustrated in FIG. 7(B) in the section in which the AMCC signal illustrated in FIG. 7(C) is 1, and the sign is the same as the quadrature-phase component of the modulation signal of the main signal illustrated in FIG. 7(B) in the section in which the AMCC signal illustrated in FIG. 7(C) is 0.

At this time, in a case where the in-phase component of the modulation signal of the main signal illustrated in FIG. 7(A) and the signal illustrated in FIG. 7(D) are superimposed on each other to be the modulation signal to the Mach-Zehnder modulator 13A of the IQ modulator 13, and the in-phase component of the modulation signal of the main signal illustrated in FIG. 7(B) and the signal illustrated in FIG. 7(E) are superimposed on each other to be the modulation signal to the Mach-Zehnder modulator 13B of the IQ modulator 13, the signal light including both the components of the main signal and the AMCC signal can be generated only by one IQ modulator 13.

That is, the signal light received by the coherent receiver 32 of the coherent optical reception device 3 of the second embodiment is obtained by superimposing the AMCC signal on the main signal by performing the phase modulation corresponding to the AMCC signal, similarly to the signal light received by the coherent receiver 32 of the coherent optical reception device 3 of the first embodiment.

In the coherent optical transmission system 100 to which the coherent optical reception device 3 of the first embodiment is applied, the phase modulation corresponding to the AMCC signal is performed in the phase modulator 16, whereas in the coherent optical transmission system 100 to which the coherent optical reception device 3 of the third embodiment is applied, the phase modulation corresponding to the AMCC signal is performed in the IQ modulator 13 on which the IQ modulation corresponding to the main signal is performed. As described above, in the configuration of the second embodiment, since the phase modulator 16 is unnecessary, cost reduction due to reduction in the number of devices is expected.

Third Embodiment

Hereinafter, a third embodiment of a coherent optical reception device and a coherent optical reception method of the present invention will be described.

The coherent optical reception device 3 of the third embodiment is configured similarly to the coherent optical reception device 3 of the first embodiment described above except for the points described later. Therefore, according to the coherent optical reception device 3 of the third embodiment, it is possible to achieve the same effects as those of the coherent optical reception device 3 of the first embodiment described above except for the points described later.

Similarly to the coherent optical reception device 3 of the first embodiment, the coherent optical reception device 3 of the third embodiment includes a local oscillation light generator 31, a coherent receiver 32, an analog-to-digital converter (ADC) 33, and a digital signal processor (DSP processor) 34.

Similarly to the coherent receiver 32 of the coherent optical reception device 3 of the first embodiment, the coherent receiver 32 receives signal light in which the AMCC signal is superimposed on the main signal by phase modulation, converts the signal light into an analog electric signal, and outputs the in-phase component and the quadrature-phase component of the reception signal.

Similarly to the digital signal processor 34 of the coherent optical reception device 3 of the first embodiment, the digital signal processor 34 demodulates the code sequence of the AMCC signal and the code sequence of the main signal from the reception signal by performing digital signal processing on the reception signal.

Figure 8:
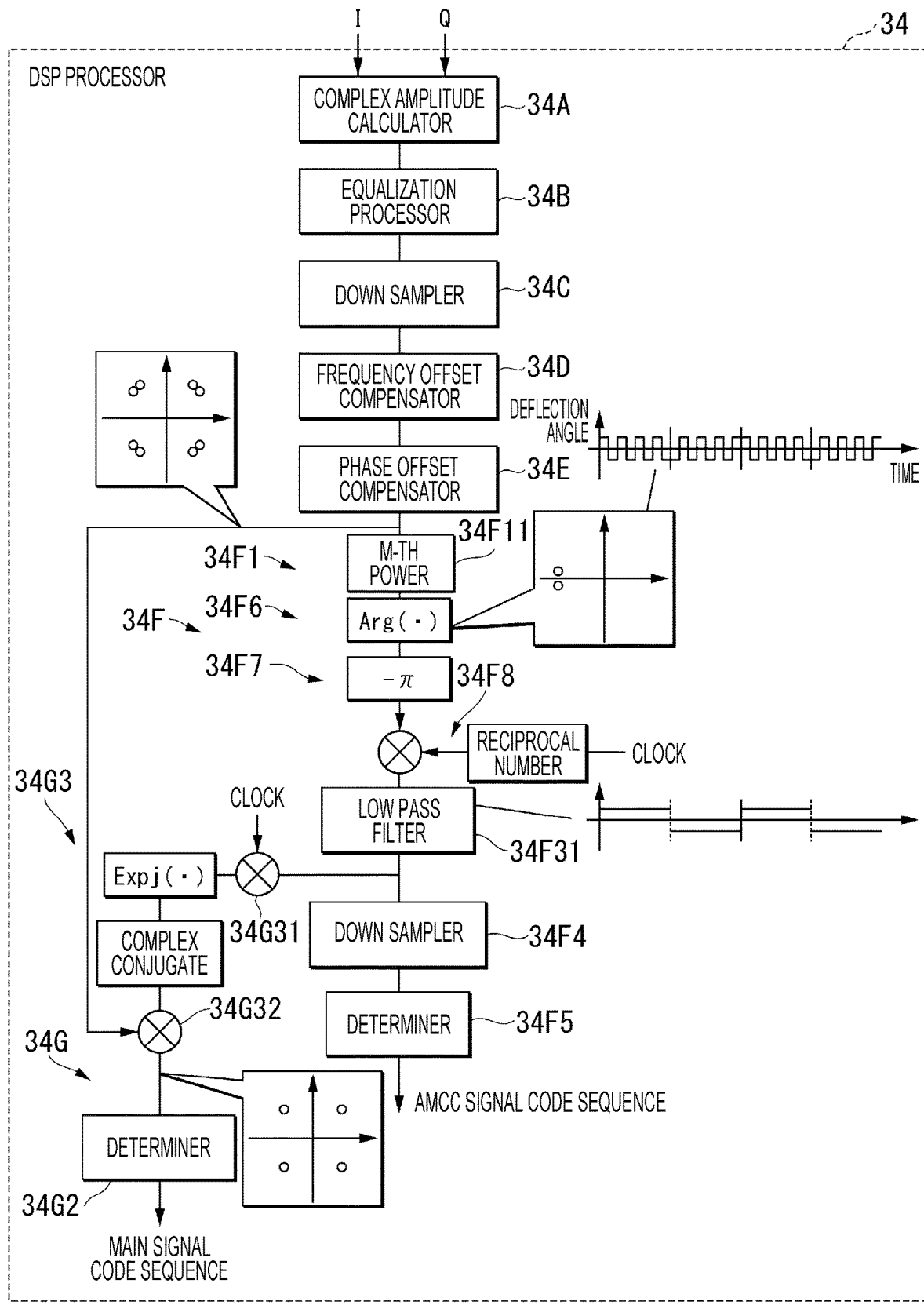
FIG. 8 is a diagram illustrating an example of a detailed configuration of a digital signal processor of a coherent optical reception device of a third embodiment.

FIG. 8 is a diagram illustrating an example of a detailed configuration of the digital signal processor 34 of a coherent optical reception device 3 of a third embodiment.

In the example illustrated in FIG. 8, the digital signal processor 34 includes a complex amplitude calculator 34A, an equalization processor 34B, a down sampler 34C, a frequency offset compensator 34D, a phase offset compensator 34E, an AMCC signal code sequence demodulator 34F, and a main signal code sequence demodulator 34G.

Similarly to the complex amplitude calculator 34A of the coherent optical reception device 3 of the first embodiment, the complex amplitude calculator 34A calculates the complex amplitude of the reception signal including the in-phase component (I signal) and the quadrature-phase component (Q signal) discretized by the analog-to-digital converter 33.

Similarly to the equalization processor 34B of the coherent optical reception device 3 of the first embodiment, the equalization processor 34B performs equalization processing on the signal output from the complex amplitude calculator 34A.

Similarly to the down sampler 34C of the coherent optical reception device 3 of the first embodiment, the down sampler 34C down-samples the signal output from the equalization processor 34B.

Similarly to the frequency offset compensator 34D of the coherent optical reception device 3 of the first embodiment, the frequency offset compensator 34D performs frequency offset compensation on the signal output from the down sampler 34C.

Similarly to the phase offset compensator 34E of the coherent optical reception device 3 of the first embodiment, the phase offset compensator 34E performs phase offset compensation on the signal output from the frequency offset compensator 34D.

The constellation of the signal output from the phase offset compensator 34E is, for example, as illustrated in the center left of FIG. 8.

The reception signal output from the phase offset compensator 34E is input to the AMCC signal code sequence demodulator 34F and the main signal code sequence demodulator 34G.

In the example illustrated in FIG. 8, the AMCC signal code sequence demodulator 34F demodulates the code sequence of the AMCC signal included in the reception signal output from the phase offset compensator 34E. The AMCC signal code sequence demodulator 34F includes a main signal component remover 34F1, a deflection angle calculator 34F6, a n subtractor 34F7, a clock reciprocal multiplicator 34F8, a high frequency noise eliminator 34F3, a down sampler 34F4, and a determiner 34F5.

Similarly to the main signal component remover 34F1 of the coherent optical reception device 3 of the first embodiment, the main signal component remover 34F1 removes the main signal included in the reception signal output from the phase offset compensator 34E by the M-th operator 34F11 performing the M-th operation on the reception signal output from the phase offset compensator 34E.

The constellation of the reception signal output from the main signal component remover 34F1 (constellation of reception signal after main signal is removed by main signal component remover 34F1) is, for example, as illustrated in the center right of FIG. 8.

In the example illustrated in FIG. 8, the deflection angle calculator 34F6 calculates the deflection angle of the complex amplitude of the reception signal M-multiplied by the M-th operator 34F11 of the main signal component remover 34F1.

The complex amplitude of the reception signal M-multiplied by the M-th operator 34F11 is expressed by Equation (6) below (M=4).

$$E^4 = \exp(j(\pi + 4\varphi_{AMCC}(n)\varphi_{clock}(n))) \quad (6)$$

The deflection angle calculated by the deflection angle calculator 34F6 is expressed by Equation (7) below.

$$\mathrm{Arg}(E^4) = \pi + 4\varphi_{AMCC}(n)\varphi_{clock}(n) \quad (7)$$

In the example illustrated in FIG. 8, the n subtractor 34F7 subtracts n from the deflection angle calculated by the deflection angle calculator 34F6.

The operation result by the n subtractor 34F7 is expressed by Equation (8).

$$\mathrm{Arg}(E^4) - \pi = 4\varphi_{AMCC}(n)\varphi_{clock}(n) \quad (8)$$

The clock reciprocal multiplicator 34F8 multiplies a result obtained by subtracting n from the deflection angle calculated by the n subtractor 34F7 by the reciprocal of the clock. That is, the clock reciprocal multiplicator 34F8 multiplies a result obtained by subtracting n from the deflection angle calculated by the n subtractor 34F7 by the reciprocal of the clock obtained by multiplying the modulation signal of the AMCC signal superimposed on the main signal by the clock multiplicator 15 of the coherent optical transmission device 1.

The operation result by the clock reciprocal multiplicator 34F8 is expressed by Equation (9) below.

$$(\mathrm{Arg}(E^4) - \pi) \times (1/\varphi_{clock}(n)) = 4\varphi_{AMCC}(n) \quad (9)$$

As described above, the clock reciprocal multiplicator 34F8 can extract the AMCC signal component from the reception signal.

Figure 9:
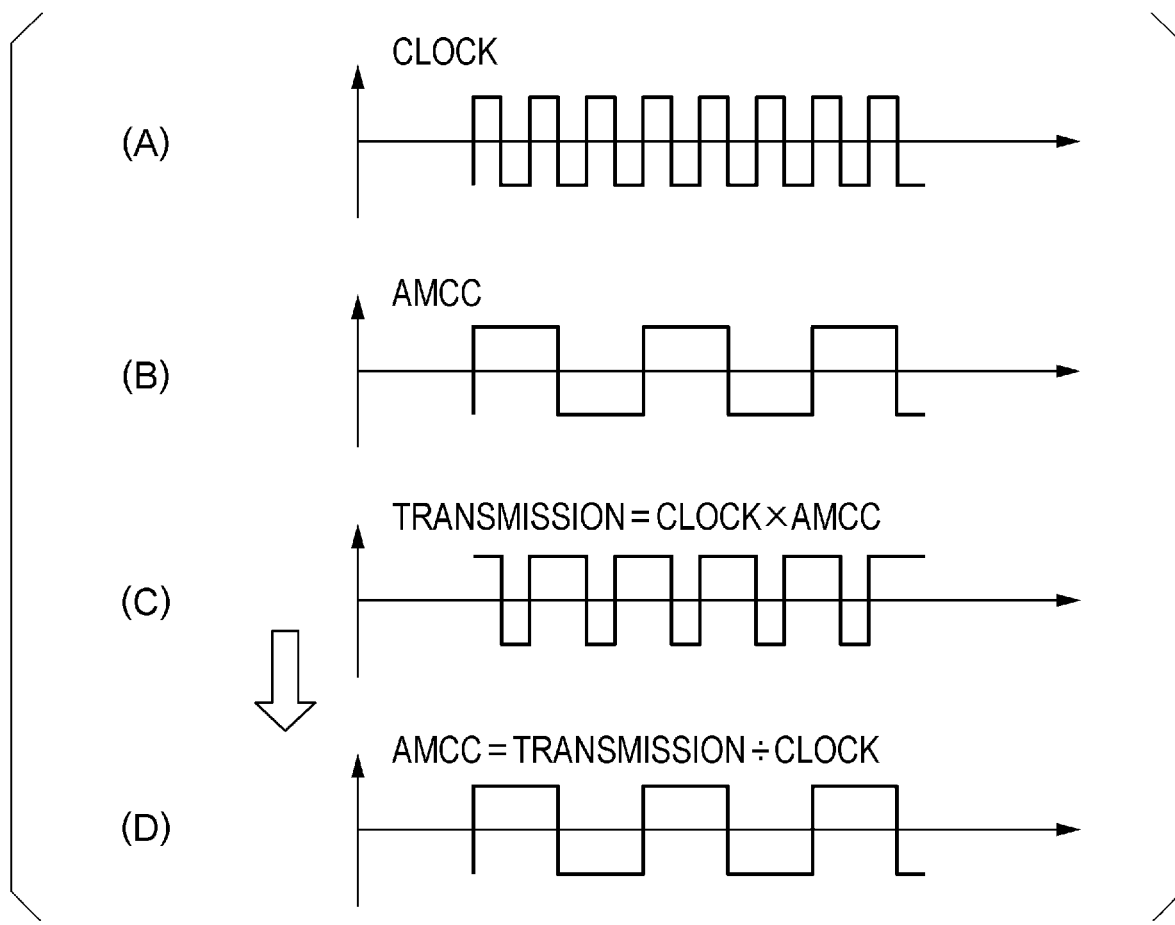
FIG. 9 is a diagram illustrating an example of a time waveform and the like of an AMCC signal component extracted by a clock reciprocal multiplicator.

FIG. 9 is a diagram illustrating an example of a time waveform and the like of the AMCC signal component extracted by the clock reciprocal multiplicator 34F8.

Specifically, FIG. 9(A) illustrates an example of a time waveform of a clock multiplied by the clock multiplicator 15 of the coherent optical transmission device 1. FIG. 9(B) illustrates an example of a time waveform of the modulation signal of the AMCC signal input from the modulation signal generator 14 of the coherent optical transmission device 1 to the clock multiplicator 15. FIG. 9(C) illustrates an example of a time waveform of an operation result of the clock multiplicator 15 (time waveform of the AMCC signal component included in the optical signal transmitted by the coherent optical transmission device 1). FIG. 9(D) illustrates an example of a time waveform of an operation result of the clock reciprocal multiplicator 34F8 (time waveform of the AMCC signal component extracted from the reception signal).

As illustrated in FIG. 9, the clock reciprocal multiplicator 34F8 can extract the AMCC signal component (modulation signal of the AMCC signal generated by the modulation signal generator 14 of the coherent optical transmission device 1) from the reception signal.

In the example illustrated in FIG. 8, the high frequency noise eliminator 34F3 eliminates the high frequency noise included in the product obtained by multiplying the reciprocal of the clock by the clock reciprocal multiplicator 34F8. The high frequency noise eliminator 34F3 includes a low pass filter 34F31. That is, the high frequency noise eliminator 34F3 eliminates the high frequency noise included in the product multiplied by the reciprocal of the clock by using the low pass filter 34F31.

Similarly to the down sampler 34F4 of the coherent optical reception device 3 of the first embodiment, the down sampler 34F4 performs down-sampling from the symbol rate of the main signal to the symbol rate of the AMCC signal.

Similarly to the determiner 34F5 of the coherent optical reception device 3 of the first embodiment, the determiner 34F5 demodulates the code sequence of the AMCC signal included in the reception signal by performing threshold determination.

The main signal code sequence demodulator 34G demodulates the code sequence of the main signal included in the reception signal output from the phase offset compensator 34E. The main signal code sequence demodulator 34G includes an AMCC signal component remover 34G3 and a determiner 34G2.

The AMCC signal component remover 34G3 removes the AMCC signal included in the reception signal output from the phase offset compensator 34E. The AMCC signal component remover 34G3 includes a complex amplitude calculator 34G31 and a complex conjugate product calculator 34G32.

The complex amplitude calculator 34G31 multiplies the product from which the high frequency noise has been eliminated by the high frequency noise eliminator 34F3 by the clock to calculate the complex amplitude having an absolute value of 1.

The operation result (complex amplitude having an absolute value of 1) by the complex amplitude calculator 34G31 is expressed by the following expression.

$$\exp(j(4\varphi_{AMCC}(n)\varphi_{clock}(n)\times\beta))$$

The complex conjugate product calculator 34G32 calculates a complex conjugate product of the complex amplitude having an absolute value of 1 calculated by the complex amplitude calculator 34G31 and the reception signal output from the phase offset compensator 34E.

Specifically, the complex conjugate product calculator 34G32 calculates a complex conjugate product of a complex amplitude having an absolute value of 1 and the original reception signal E(n) as expressed by Equation (10) below.

$$E(n)\times(\exp(j(4\varphi_{AMCC}(n)\varphi_{clock}(n)\times\beta)))^* = \exp(j((\varphi_{main}(n)+\varphi_{AMCC}(n)\times\varphi_{clock}(n)))\times\exp(-j(4(\beta\varphi_{AMCC}(n)\varphi_{clock}(n)))) = \exp(j(\varphi_{main}(n)+\varphi_{AMCC}(n)\times\varphi_{clock}(n)\times(1-4\beta)))$$

Here, when $\beta$ is set such that $1-4\beta=0$, $$=\exp(j(\varphi_{main}(n))) \qquad (10)$$

As described above, the AMCC signal can be removed from the main signal component, and the noise characteristic of the main signal can be improved.

The constellation of the signal output from the complex conjugate product calculator 34G32 is, for example, as illustrated in the lower left of FIG. 8.

Similarly to the determiner 34G2 of the coherent optical reception device 3 of the first embodiment, the determiner 34G2 performs normal threshold determination in the digital coherent transmission system, and outputs a main signal code sequence.

As described above, in the coherent optical reception device 3 of the third embodiment, the clock reciprocal multiplicator 34F8 multiplies the reception signal by the reciprocal of the clock to remove the clock.

According to the coherent optical reception device 3 of the third embodiment, the superimposed AMCC signal and the main signal can be separated in the digital signal processor 34.

Figure 10:
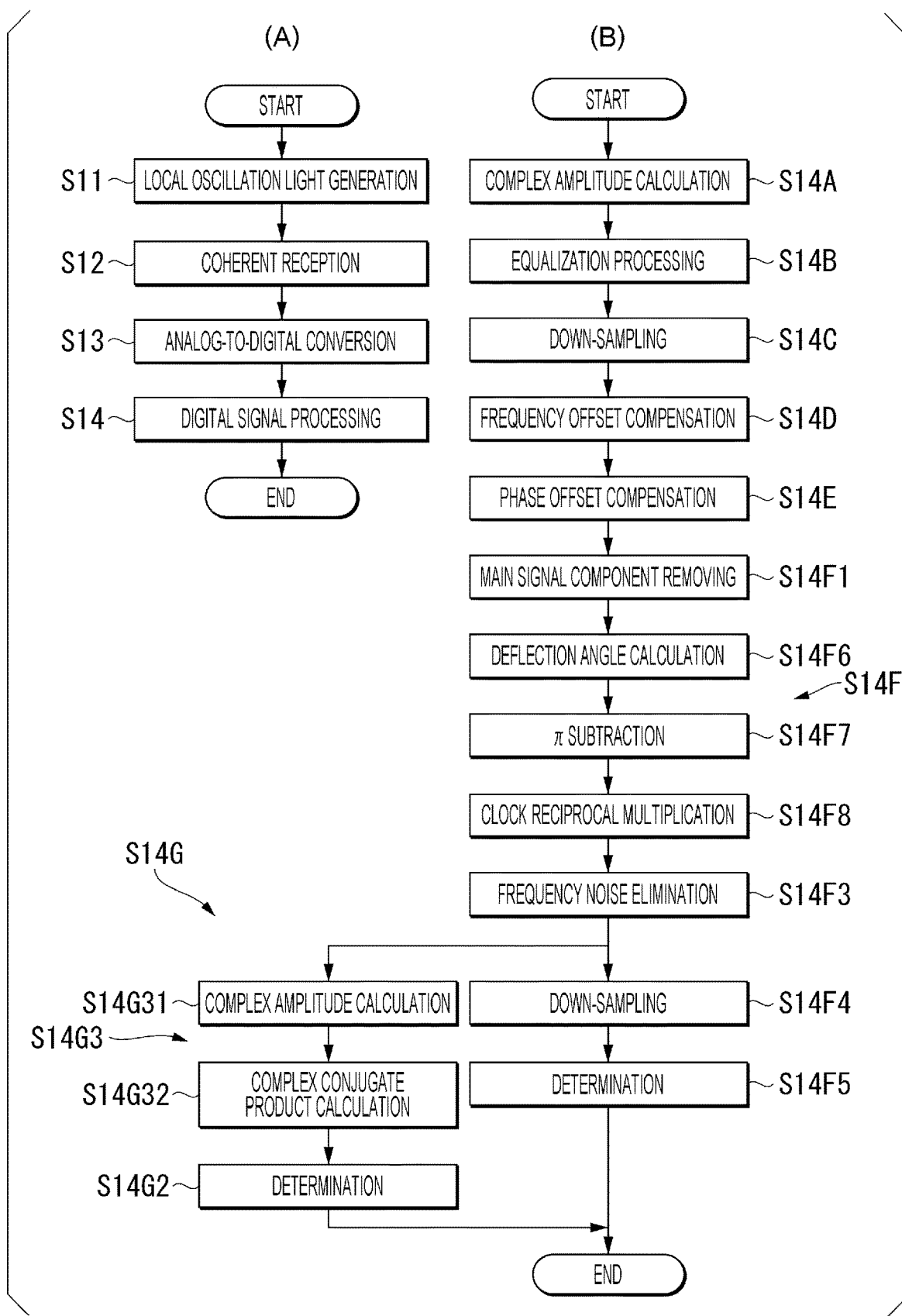
FIG. 10 is a flowchart for illustrating an example of processing executed in the coherent optical reception device of the third embodiment.

FIG. 10 is a flowchart for illustrating an example of processing executed in the coherent optical reception device 3 of the third embodiment. Specifically, FIG. 10(A) illustrates main processing executed in the coherent optical reception device 3 of the third embodiment, and FIG. 10(B) illustrates processing executed in step S14 of FIG. 10(A).

In the example illustrated in FIG. 10, in step S11, the local oscillation light generator 31 generates local oscillation light similarly to step S1 in FIG. 4.

Next, in step S12, the coherent receiver 32 receives signal light transmitted by the optical fiber 2 (that is, the signal light in which the AMCC signal is superimposed on the main signal), converts the optical signal into an analog electric signal, and outputs the in-phase component and the quadrature-phase component of the reception signal similarly to step S2 in FIG. 4. The modulation signal of the AMCC signal superimposed on the main signal is multiplied by a clock.

Next, in step S13, the analog-to-digital converter 33 samples and discretizes the analog electric signal output from the coherent receiver 32 (that is, performs analog-to-digital conversion) similarly to step S3 in FIG. 4.

Next, in step S14, the digital signal processor 34 performs digital signal processing on the reception signal discretized in step S3 to demodulate the code sequence corresponding to the AMCC signal and the code sequence corresponding to the main signal from the reception signal.

Specifically, in step S14A, the complex amplitude calculator 34A calculates the complex amplitude of the reception signal including the in-phase component (I signal) and the quadrature-phase component (Q signal) discretized in step S13 similarly to step S4A in FIG. 4.

Next, in step S14B, the equalization processor 34B performs equalization processing on the signal output from the complex amplitude calculator 34A in step S14A similarly to step S4B in FIG. 4.

Next, in step S14C, the down sampler 34C down-samples the signal output from the equalization processor 34B in step S14B similarly to step S4C in FIG. 4.

Next, in step S14D, the frequency offset compensator 34D performs frequency offset compensation on the signal output from the down sampler 34C in step S14C similarly to step S4D in FIG. 4.

Next, in step S14E, the phase offset compensator 34E performs phase offset compensation on the signal output from the frequency offset compensator 34D in step S14D similarly to step S4E in FIG. 4.

Next, in step S14F, the AMCC signal code sequence demodulator 34F demodulates the code sequence of the AMCC signal included in the signal output from the phase offset compensator 34E in step S14E.

Specifically, in step S14F1, the main signal component remover 34F1 performs the M-th operation on the signal output from the phase offset compensator 34E in step S14E, thereby removing the main signal included in the reception signal similarly to step S4F1 in FIG. 4.

Next, in step S14F6, the deflection angle calculator 34F6 calculates the deflection angle of the complex amplitude of the reception signal M-multiplied in step S14F1.

Next, in step S14F7, the n subtractor 34F7 subtracts n from the deflection angle calculated in step S14F6.

Next, in step S14F8, the clock reciprocal multiplicator 34F8 multiplies a result obtained by subtracting n from the deflection angle calculated in step S14F7 by the reciprocal of the clock.

Next, in step S14F3, similarly to step S4F3 in FIG. 4, the high frequency noise eliminator 34F3 eliminates the high frequency noise included in the result of multiplication by the reciprocal of the clock in step S14F8 using the low pass filter 34F31.

Next, in step S14F4, similarly to step S4F4 in FIG. 4, the down sampler 34F4 extracts a symbol by performing down-sampling on the reception signal from which the high frequency component has been removed in step S14F3.

Next, in step S14F5, similarly to step S4F5 in FIG. 4, the determiner 34F5 performs threshold determination to demodulate the code sequence of the AMCC signal included in the reception signal.

In addition, after step S14F3, in step S14G, the main signal code sequence demodulator 34G demodulates the code sequence of the main signal included in the signal output from the phase offset compensator 34E in step S14E.

Specifically, in step S14G3, the AMCC signal component remover 34G3 removes the AMCC signal included in the reception signal output from the phase offset compensator 34E in step S14E.

More specifically, in step S14G31, the complex amplitude calculator 34G31 multiplies a result obtained by eliminating the high frequency noise in step S14F3 by the clock to calculate the complex amplitude having an absolute value of 1.

Next, in step S14G32, the complex conjugate product calculator 34G32 calculates a complex conjugate product of the complex amplitude having an absolute value of 1 calculated in step S14G31 and the reception signal output from the phase offset compensator 34E in step S14E.

Next, in step S14G2, similarly to step S4G2 in FIG. 4, the determiner 34G2 performs normal threshold determination in the digital coherent transmission system, and outputs a main signal code sequence.

As above, the embodiments of the present invention have been described in detail with reference to the drawings. On the other hand, the specific configuration is not limited to the embodiments, and includes design and the like without departing from the spirit of the present invention.

INDUSTRIAL APPLICABILITY

The coherent optical reception device and the coherent optical reception method of the present invention are applicable to a coherent optical transmission system.

REFERENCE SIGNS LIST

100 Coherent optical transmission system
1 Coherent optical transmission device
11 Light source
12 Modulation signal generator
13 IQ modulator
13A Mach-Zehnder modulator
13B Mach-Zehnder modulator
13C π/2 phase difference setter
14 Modulation signal generator
15 Clock multiplicator
16 Phase modulator
2 Optical fiber
3 Coherent optical reception device
31 Local oscillation light generator
32 Coherent receiver
33 Analog-to-digital converter
34 Digital signal processor
34A Complex amplitude calculator
34B Equalization processor
34C Down sampler
34D Frequency offset compensator
34E Phase offset compensator
34F AMCC signal code sequence demodulator
34F1 Main signal component remover
34F11 M-th operator
34F2 Clock component remover
34F21 Complex conjugate product calculator
34F3 High frequency noise eliminator
34F31 Low pass filter
34F4 Down sampler
34F5 Determiner
34F6 Deflection angle calculator
34F7 π subtractor
34F8 clock reciprocal multiplicator
34G Main signal code sequence demodulator
34G1 AMCC signal component remover
34G11 Complex conjugate product calculator
34G2 Determiner
34G3 AMCC signal component remover
34G31 Complex amplitude calculator
34G32 Complex conjugate product calculator

The invention claimed is:
1. A coherent optical reception device comprising:
a coherent receiver that receives signal light in which an auxiliary management and control channel (AMCC) signal is superimposed on a main signal by phase modulation, converts the signal light into an analog electric signal, and outputs an in-phase component and a quadrature-phase component of the reception signal; and a digital signal processor that demodulates a code sequence of the AMCC signal and a code sequence of the main signal from the reception signal by performing digital signal processing on the reception signal, wherein a modulation signal of the AMCC signal superimposed on the main signal is multiplied by a clock, the digital signal processor includes a symbol output that extracts and outputs a symbol of the main signal from the reception signal output from the coherent receiver, an AMCC signal code sequence demodulator that demodulates a code sequence of the AMCC signal, and a main signal code sequence demodulator that demodulates a code sequence of the main signal, and the AMCC signal code sequence demodulator includes a main signal component remover that removes the main signal included in the reception signal output from the symbol output and a clock component remover that removes a clock component included in the reception signal after the main signal is removed by the main signal component remover.

2. The coherent optical reception device according to claim 1, wherein the clock component remover removes the clock component by calculating a complex conjugate product of two adjacent symbols included in the reception signal from which the main signal has been removed by the main signal component remover.

3. The coherent optical reception device according to claim 1, further comprising:

a deflection angle calculator that calculates a deflection angle of a complex amplitude of the reception signal from which the main signal has been removed by the main signal component remover;

a TT subtractor that subtracts TT from the deflection angle calculated by the deflection angle calculator; and a clock reciprocal multiplicator that multiplies the value obtained by subtracting TT from the deflection angle calculated by the TT subtractor by the reciprocal of the clock.

4. The coherent optical reception device according to claim 1, wherein the main signal code sequence demodulator includes an AMCC signal component remover that removes the AMCC signal included in the reception signal output from the symbol output based on the AMCC signal obtained by the AMCC signal code sequence demodulator.

5. The coherent optical reception device according to claim 4, wherein the AMCC signal code sequence demodulator includes a high frequency noise eliminator that eliminates high frequency noise included in the reception signal from which the clock component has been removed by the clock component remover, and the AMCC signal component remover removes the AMCC signal by calculating a complex conjugate product of the reception signal from which the high frequency noise has been eliminated by the high frequency noise eliminator and the reception signal output from the symbol output.

6. The coherent optical reception device according to claim 1, wherein the signal light received by the coherent receiver is signal light in which the AMCC signal is superimposed on the main signal by performing phase modulation corresponding to the AMCC signal, and the phase modulation corresponding to the AMCC signal is performed in an IQ modulator on which IQ modulation corresponding to the main signal is performed.

7. The coherent optical reception device according to claim 3, wherein the AMCC signal code sequence demodulator includes a high frequency noise eliminator that eliminates high frequency noise included in a result after multiplication by a reciprocal of the clock by the clock reciprocal multiplicator, the main signal code sequence demodulator includes an AMCC signal component remover that removes the AMCC signal included in the reception signal output from the symbol output, and the AMCC signal component remover includes a complex amplitude calculator that multiplies a result obtained by eliminating the high frequency noise by the high frequency noise eliminator by the clock to calculate a complex amplitude having an absolute value of 1 and a complex conjugate product calculator that calculates a complex conjugate product of the complex amplitude with the absolute value of 1 calculated by the complex amplitude calculator and the reception signal output from the symbol output.

8. A coherent optical reception method comprising:

receiving signal light in which an AMCC signal is superimposed on a main signal by phase modulation, converting the signal light into an analog electric signal, and outputting an in-phase component and a quadrature-phase component of the reception signal; and demodulating a code sequence of the AMCC signal and a code sequence of the main signal from the reception signal by performing digital signal processing on the reception signal, wherein multiplying by clock, a modulation signal of the AMCC signal superimposed on the main signal, extracting and outputting, a symbol of the main signal from the reception signal, demodulating, a code sequence of the AMCC signal, demodulating, a code sequence of the main signal, removing, the main signal included in the reception signal, and removing, a clock component included in the reception signal.

* * * * *